United States Patent
Bellera

(10) Patent No.: US 7,427,046 B2
(45) Date of Patent: Sep. 23, 2008

(54) OPTIMIZED METHOD OF CONTROLLING YAW FOR ROTARY-WING AIRCRAFT, AND A SYSTEM FOR IMPLEMENTING IT

(75) Inventor: Jacques Bellera, Aix en Provence (FR)

(73) Assignee: Eurocopter, Cedex (FR)

( * ) Notice: Subject to any disclaimer, the term of this patent is extended or adjusted under 35 U.S.C. 154(b) by 528 days.

(21) Appl. No.: 11/152,095

(22) Filed: Jun. 15, 2005

(65) Prior Publication Data

US 2005/0284983 A1      Dec. 29, 2005

(30) Foreign Application Priority Data

Jun. 15, 2004 (FR) .................................. 04 06435

(51) Int. Cl.
*B64C 27/78* (2006.01)

(52) U.S. Cl. ................................................ 244/17.21
(58) Field of Classification Search ............. 244/17.19, 244/17.21, 17.25; 416/25, 43; 60/39.282
See application file for complete search history.

(56) References Cited

U.S. PATENT DOCUMENTS

| 4,493,465 | A |   | 1/1985  | Howlett et al. |
|-----------|---|---|---------|----------------|
| 5,188,511 | A |   | 2/1993  | Ebert          |
| 6,142,413 | A | * | 11/2000 | Dequin et al. ............ 244/17.13 |
| 6,290,171 | B1 | * | 9/2001 | Dequin et al. ............ 244/17.19 |

\* cited by examiner

*Primary Examiner*—Rob Swiatek
(74) *Attorney, Agent, or Firm*—Young & Thompson

(57) ABSTRACT

A method of the invention for controlling the pitch of the blades of a tail rotor of a rotary-wing aircraft includes the following operations:

a) generating a main control for the pitch of the blades of the tail rotor as a function of a control member for controlling the pitch of the blades of the tail rotor that is actuated by a pilot of the aircraft;

b) generating a collective pitch and yaw decoupling control as a function of the collective pitch of the rotary wing;

c) generating a bias control that is variable as a function of the flying speed of the aircraft and of the position of the control member; and d) adding the bias control to the decoupling control and to the main control in order to obtain an overall control, thereby controlling the pitch of the blades of the tail rotor.

20 Claims, 4 Drawing Sheets

OPTIMIZED METHOD OF CONTROLLING YAW FOR ROTARY-WING AIRCRAFT, AND A SYSTEM FOR IMPLEMENTING IT

The present invention relates to an optimized method of controlling yaw for a rotary-wing aircraft, and to apparatus for implementing the method.

FIELD OF THE INVENTION

The technical field of the invention is that of designing rotary-wing aircraft.

The present invention relates more particularly to an optimized method of controlling yaw for a helicopter having a main rotor and a rear or tail rotor, by causing the collective pitch of the blades of the tail rotor to vary.

BACKGROUND OF THE INVENTION

The lift of a helicopter is provided by the main rotor via its collective pitch position. In the present application, the term "collective pitch" refers to the collective pitch of the blades of the main rotor, unless specified otherwise.

The collective pitch of the blades of the main rotor is measured at the collective pitch control; this control comes from an instruction applied by the pilot to the collective pitch control member, however this instruction might be corrected by an automatic pilot type apparatus as a function of other parameters; there is no strict equivalence between the position of the pitch control member for the blades of the main rotor and the actual collective pitch of those blades.

The method and apparatus of the invention make priority use of information corresponding to the actual collective pitch of the main rotor; nevertheless, it is possible to make use of information relating to the position of the member for controlling the pitch of the main rotor, in particular data or a signal delivered by a potentiometer type sensor that is sensitive to the position of the pilot's collective pitch stick.

The tail rotor enables helicopter movement about the yaw axis to be controlled by performing two essential functions: the pilot-control function about the yaw axis; and the anti-torque function. The pilot-control function about the yaw axis enables the pilot to control directly and dynamically the behavior of the helicopter about its yaw axis by acting on the steering pedals to control turning, side slip, and/or lateral acceleration.

The purpose of the anti-torque function is to limit disturbances about the yaw axis whenever there is a change in the collective pitch.

In order to vary the lift of a helicopter, the angle of incidence of the blades of the main rotor is modified via the collective pitch control. This modification causes variations in the torque exerted by the main rotor on the helicopter. Without any correcting action, this variation in torque induces an effect about the yaw axis of the machine: turning or side slip. In order to mitigate that drawback, the anti-torque function automatically adjusts the control applied to the tail rotor as a function of variations in the collective pitch control.

This adjustment is implemented by positioning (and/or determining) the blade pitch variation control that is delivered to the tail rotor as a function of the position (or value) of the collective pitch, in application of a predefined relationship.

The pilot instruction generated by the pilot-control function varies around this static position or "neutral point" that results from the anti-torque function; the pitch of the tail rotor is controlled in a manner that is not necessarily symmetrical nor centered.

On a light helicopter, these two functions are generally provided by the pilot who actuates the tail rotor control pedals—or steering pedals—or other equivalent member for this purpose. Instructions from the pilot are optionally associated with correction instructions from the flight control system (automatic pilot or electrical flight control system).

On heavy helicopters (e.g. 9 (metric) tonnes or more), variations in torque on changes of collective pitch are large and generate strong disturbances about the yaw axis. The anti-torque function requires high levels of yaw control that cannot be handled directly from the steering pedals (see operational constraints specified below). It is therefore necessary to separate these two functions by providing a specific apparatus enabling the anti-torque function to be handled automatically.

Implementing these two functions is generally done as follows:

the anti-torque function is implemented by a mechanical decoupling box which arbitrarily applies a pitch variation control to the tail rotor that is proportional to the collective pitch applied to the main rotor;

the function of pilot control about the yaw axis is performed directly by the pilot acting on the pedals; the pilot instruction is associated with additional instructions from the flight control system (automatic pilot or electrical flight control system).

There are several kinds of operational constraint that influence the control of yaw in a helicopter:

both in cruising flight and in hovering flight, it is necessary for the neutral position of the pedals to be more or less centered; this improves pilot comfort by avoiding any need for the pilot to accept a continuous static offset in foot position;

the control available to the pilot via the pedals must provide sufficient maneuverability about the yaw axis, particularly while hovering;

the control available to the pilot via the pedals must provide sufficient margin to counter cross-wind (with a strong cross-wind, the yaw control is used to a considerable extent in order to maintain heading); and control sensitivity, i.e. the ratio between movement of the pedals and the control applied to the tail rotor, must be optimized and must not increase excessively if protection is to be provided against the risk of piloted pumping.

Furthermore, on a helicopter, the equilibrium position for a tail rotor is not the same while cruising and while hovering.

Prepositioning the tail control via the anti-torque function is thus the result of a difficult compromise between the above-defined constraints.

In order to combine the mechanical constraints (pedal stroke) with the control sensitivity aspects, the pilot control cannot cover all desired positions: cruising and hovering (with the associated margins). After the constraints have been analyzed, a final pedal stroke is obtained that determines a compromise between ergonomics (cockpit design) and control sensitivity constraints (the risk of piloted pumping).

The compromises used in present configurations generally do not provide best optimization of all of the above-mentioned constraints and they generally give rise to the appearance of operational limitations. If the diagram is optimized for cruising, then it will be offset in static manner while hovering, with the consequence of an uncomfortable pilot position (feet offset), and consequently a limit on cross-wind coming from the side where the feet are statically offset. If it is desired to retrieve a control margin (ability to compensate for a cross-wind) by increasing the range over which the pedals provides control, then problems are rapidly encountered with piloted pumping associated with sensitivity that is too high. FIG. 2 shows the difference between a collective pitch and yaw diagram that is optimized for cruising, shown in dashed lines, and a diagram that is optimized for hovering, shown in continuous lines.

OBJECTS AND SUMMARY OF THE INVENTION

The object of the present invention is to provide a method of controlling yaw for a rotary-wing aircraft and a system for implementing the method that are improved and/or that remedy the drawbacks of known systems for controlling yaw, at least in part.

In a first aspect, the invention provides a method of controlling the blade pitch of a tail rotor of a rotary-wing aircraft, the method comprising the following operations:

a) generating a main control for the blade pitch of the tail rotor as a function of a "first control member" for controlling the pitch of the blades of the tail rotor, which member is generally constituted by the pedals and is actuated by a pilot of the aircraft;

b) generating a "collective pitch and yaw" decoupling control as a function of the collective pitch of the rotary wing;

c) generating a bias control (or instruction) that is variable as a function of the flying speed (displacement) of the aircraft and of the collective pitch of the tail rotor, in particular as a function of the flying speed and of the position of the first control member; and d) adding the bias control to said decoupling control and to said main control in order to obtain an overall yaw control, and causing the collective pitch of the blades of the tail rotor to vary as a function of said overall control.

The bias control is preferably also generated as a function of the collective pitch of the main rotor, in particular as a function of the position of a second control member actuated by the pilot to control said collective pitch of the main rotor of the aircraft.

Also preferably, the variation in the bias control as a function of speed, the variation in the bias control as a function of said position of the first control member, and/or the variation of the bias control as a function of said position of the second control member comply(ies) with one or more substantially monotonic limitation functions that can be plotted graphically as linear or exponential slopes or segments.

In another aspect, the invention provides a system for providing (overall) yaw control for a rotary-wing aircraft having a main rotor and a tail rotor, the system comprising decoupling means for delivering a decoupling control, and means for generating a main yaw control as a function of the position of a first yaw control member; the system further comprising means for determining a bias control as a function of the (overall or main) yaw control, of the speed of the aircraft, and preferably of the collective pitch, together with summing means for adding the bias control to said decoupling control and to said main control in order to obtain an overall control for the pitch of the blades of the tail rotor.

Preferably, the means for determining a bias control comprise means (CL1, CL2, CL3) for limiting the bias control over certain ranges of values (in particular for extreme values) of speed, for certain ranges of values (or for extreme values) in the position of the yaw control member and/or of the overall yaw control, and/or for extreme values of the position of a second control member (4a) for controlling the collective pitch of the main rotor, and/or for values of a signal or data representative of the collective pitch of the main rotor; the means for determining a bias control may be integrated in an electric flight control computer connected to transducers that deliver signals or data concerning the positions of the yaw control member and the collective pitch control member that are actuated by the pilot of the aircraft, and also to servo-controls for adjusting the pitch of the blades of the tail rotor.

The means for determining the bias control may be integrated in the same manner in an aircraft having conventional flight controls and an automatic pilot (a 3-axis or a 4-axis autopilot) controlling yaw; when the invention is applied to an aircraft having a mechanical control system, a specific actuator is provided on the yaw axis to apply the bias control: it may be an additional actuator or it may be an actuator that is specially adapted for this purpose.

BRIEF DESCRIPTION OF THE DRAWINGS

Other characteristics and advantages of the invention appear from the following detailed description which refers to the accompanying drawings, showing preferred implementations of the invention that are not limiting in any way.

Figure 5:
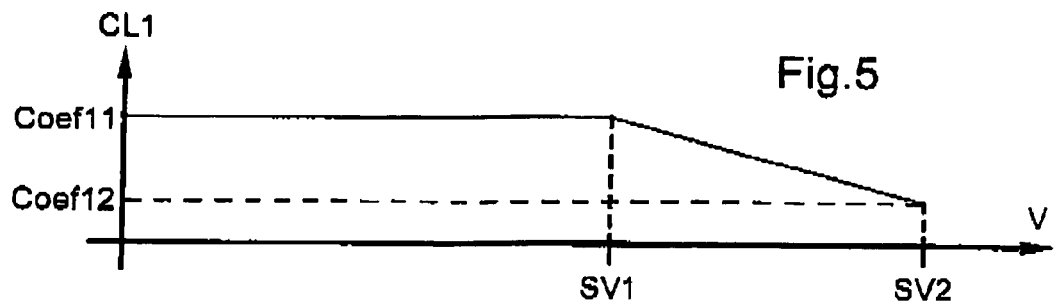
FIG. 5 is a graph showing a function for limiting bias control as a function of the travel speed of the aircraft.
Figure 6:
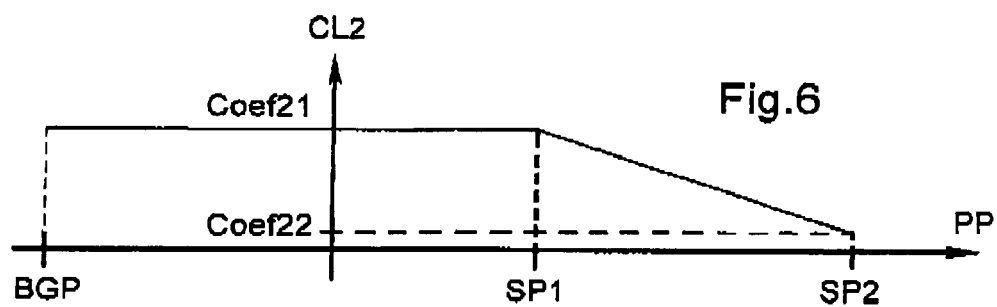
FIG. 6 is a graph showing a function for limiting bias control as a function of the position of the pedals.
Figure 7:
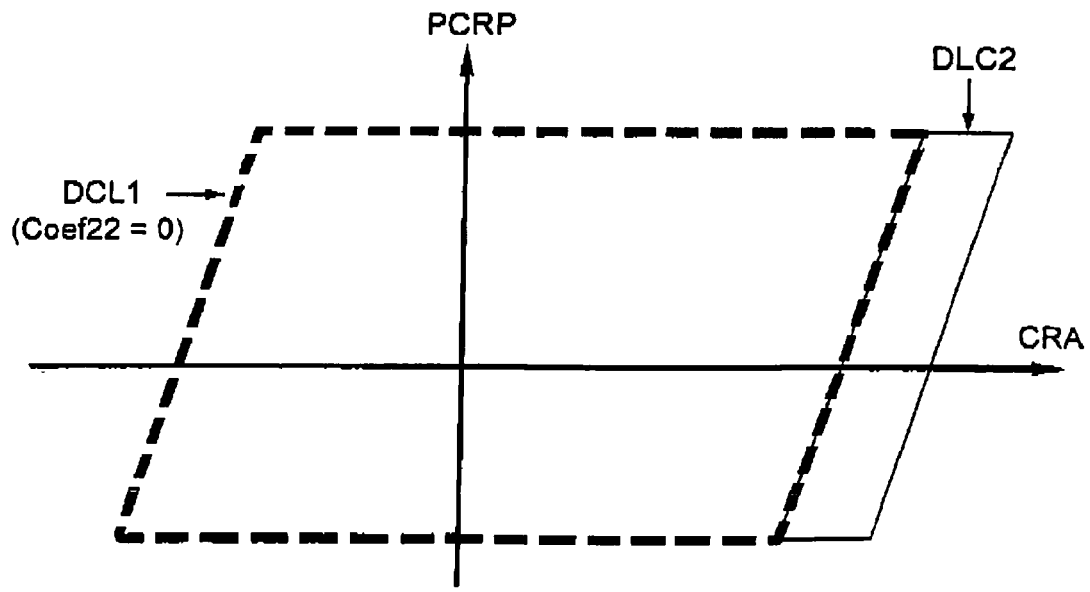
Figure 8:
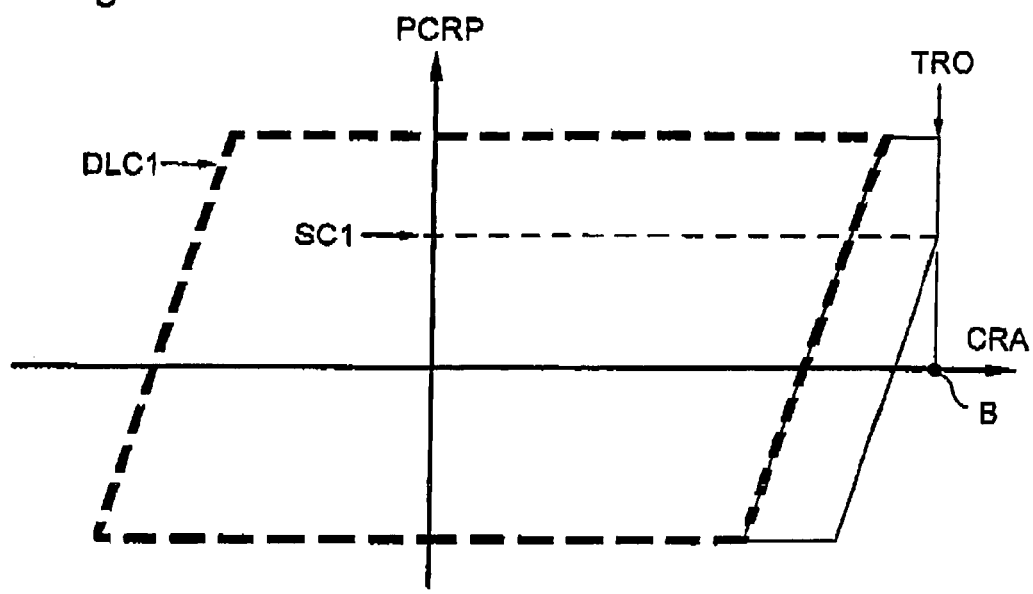

Each of FIGS. 7 and 8 shows a diagram for hovering that results from applying the limitations of FIGS. 5 and 6, while including the bias control in accordance with the invention.

Figure 9:
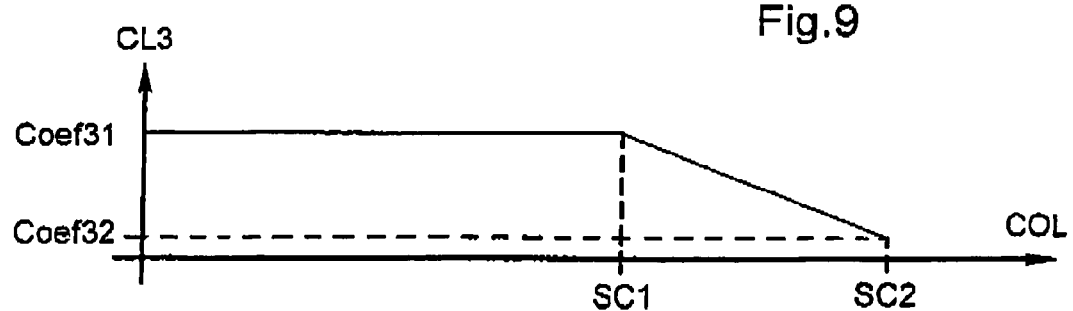

FIG. 9 is a graph showing a function for limiting the bias control as a function of the position of the collective pitch control member.

MORE DETAILED DESCRIPTION

In accordance with an aspect of the invention, the collective pitch and yaw diagram is optimized by adding thereto a varying bias control that is a function both of the type of flight and also of the positions of the pilot's controls.

With reference to FIGS. 1, 2, 7, and 8, the abscissa axis represents the amplitude of a tail rotor control CRA of a helicopter, while the ordinate axis represents the amplitude of the main rotor collective pitch PCRP.

Figure 1:
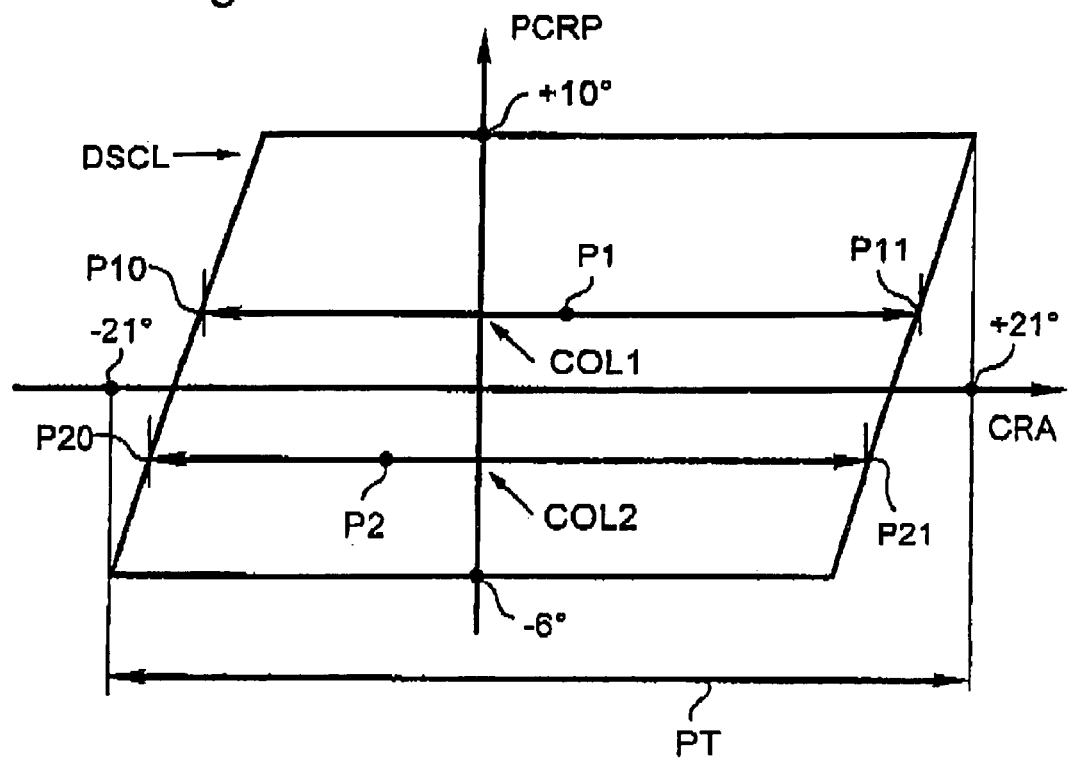
FIG. 1 shows an example of a collective pitch and yaw control diagram having the form of a parallelogram.

In the diagram of FIG. 1, the control range P1 for the tail rotor that is available to the pilot (and to the flight control system) for a particular collective position COL1 extends between a minimum control position P10 and a maximum control position P11. In another collective position COL2, the tail rotor control range accessible to the pilot is the range P2 which extends between a minimum control position P20 and a maximum control position P21. The shift from P1 to P2 due to a change in the collective pitch from COL1 to COL2 takes place following the slope of the parallelogram. In this diagram, the static decoupling between the collective pitch and yaw DSCL gives rise to the slope of the parallelogram. The total range PT for the tail rotor is swept through by causing the collective pitch to vary over its entire stroke; by way of indication, the collective pitch PCRP extends over a range going from −6° to +10°, while the tail rotor control CRA extends over a total range PT going form −21° to +21°.

Figure 2:
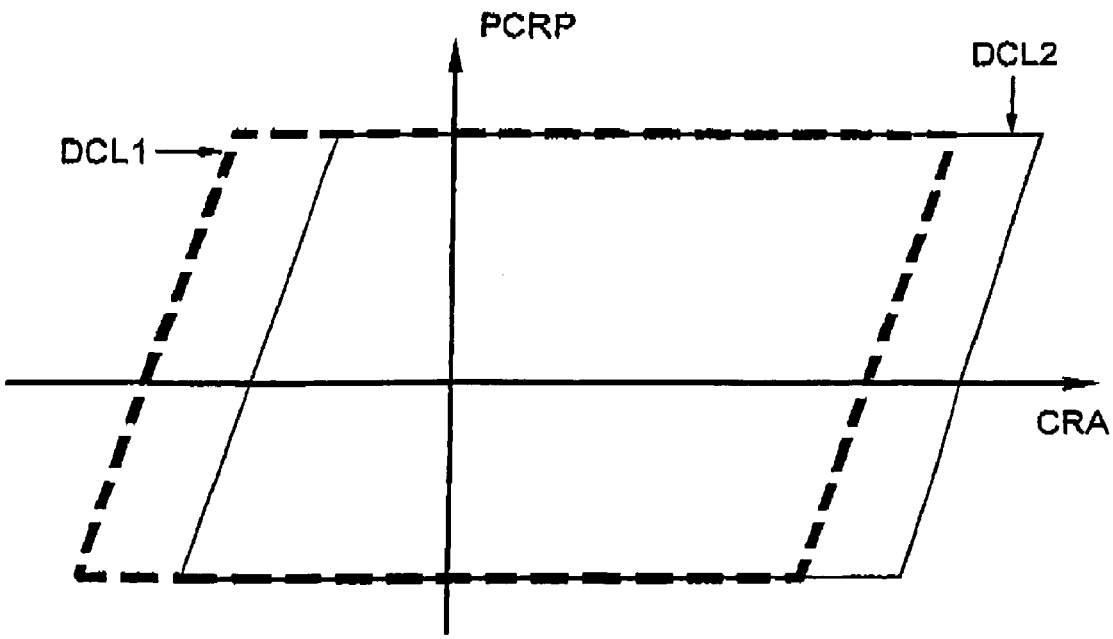
FIG. 2 shows two collective pitch and yaw control diagrams both in the form of parallelograms, that are superposed and that have been optimized respectively for a helicopter that is hovering and for the same helicopter while cruising.

With reference to FIG. 2, the collective pitch and yaw diagram DCL1 which is optimized for a first predetermined speed range (cruising) and shown in dashed bold lines, differs from the collective pitch and yaw diagram DCL2 which is optimized for the same helicopter and for a second speed range different from the first, and in particular for zero speed: the control ranges available for the pitch of the tail rotor, for a given collective pitch, are different at said cruising speed than the corresponding control ranges at zero speed; the two parallelogram-shaped diagrams are offset relative to each other along the abscissa axis.

The description below refers to applying the invention to a helicopter with an electric flight control system; the invention can also be applied to a mechanical system using specific actuators on the yaw axis.

Figure 3:
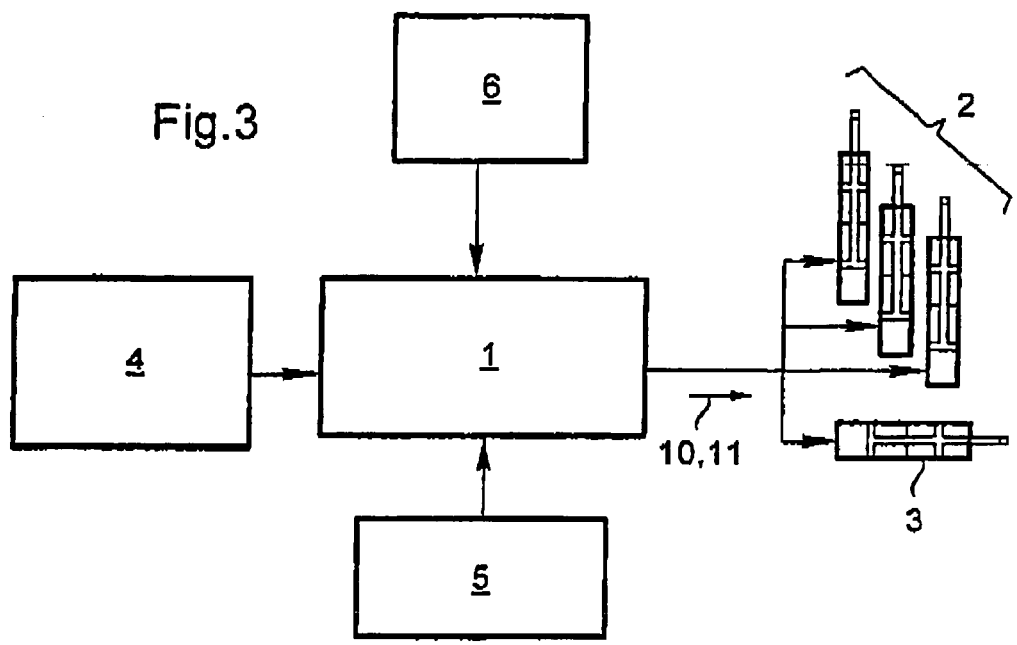
FIG. 3 is an overall block diagram of an electric flight control system.
Figure 4:
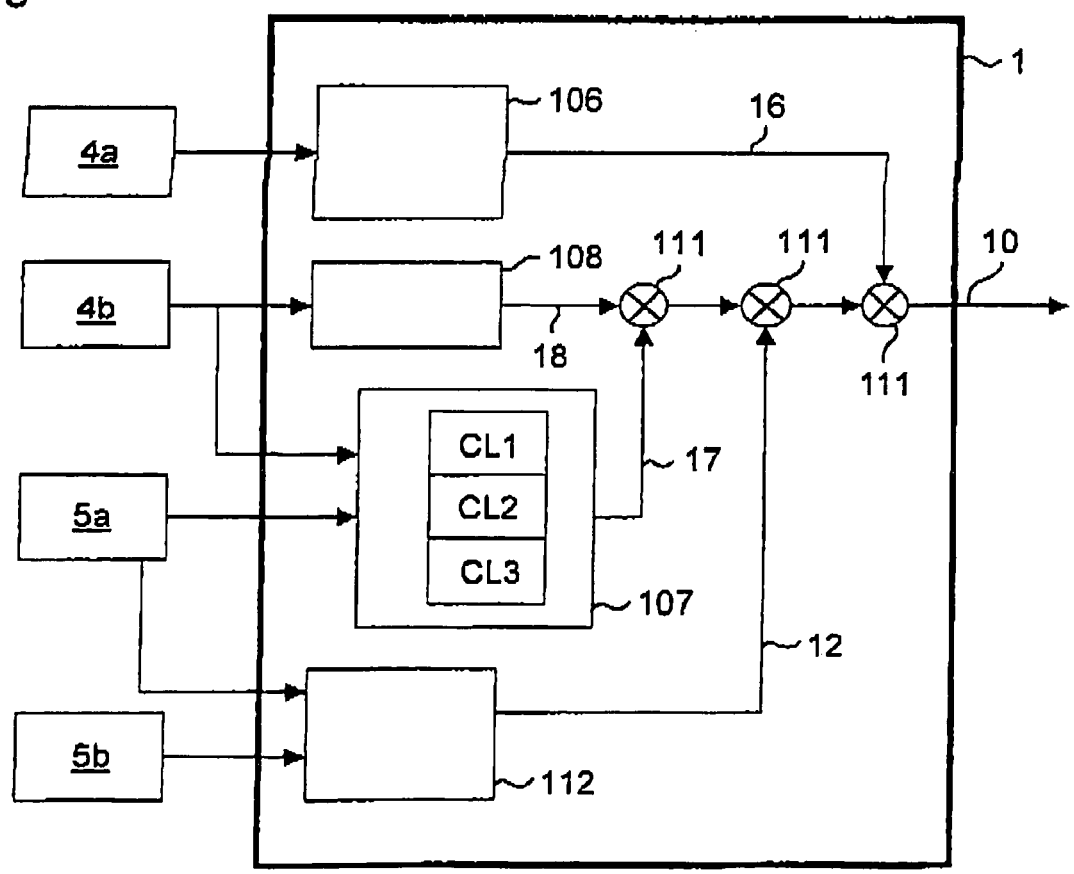
FIG. 4 shows an electric flight control system including means for calculating bias control in accordance with the invention.

With reference to FIGS. 3 and 4, a flight control system implemented by electrical flight controls comprises a computer 1 which generates instructions that are sent to the servo-controls for the main rotor 2 and the tail rotor 3 as a function of pilot instructions 4 (signals representative of the position of the cyclic stick, of the collective pitch, of the pedals, and of control knobs), sensed information 5, 5a, 5b (in particular longitudinal speed, trim, angular speeds), and information issued by other systems 6.

With reference to FIGS. 3 and 4, the flight control computer 1 generates an overall yaw control 10 on the basis of: i) electric signals delivered by position transducers fitted to the collective pitch stick 4a and the pedals 4b; ii) where appropriate, from contributions of pilot assistance functions 112 (stabilization, parameter compliance, . . . ); and iii) an anti-torque function 106; this anti-torque function, which may be implemented by means of a mechanical transmission box on a vehicle having mechanical flight controls, is implemented in this case by a decoupling function 106 included in the flight control computer 1 and issuing a collective pitch and yaw decoupling control 16; this function determines the slope of the parallelogram representing the collective pitch and yaw diagram.

The example shown in this document corresponds to a collective pitch and yaw diagram that is optimized for cruising, and to which a variable bias control 17 is applied when generating the overall yaw control 10 in order to improve performance while hovering. Alternatively, starting from a collective pitch and yaw diagram that has been optimized for hovering, it is possible on the same principles to provide a bias control that varies in order to improve cruising behavior, with the particular shapes of the limitations being adapted to match the selected configuration.

This varying bias control 17 delivered by a module 107 for calculating bias control is added (by a summing circuit 111) to the pilot control 18 delivered by a module 108, and leads to a change in the static position of the pedals 4b so as to correct, while hovering, the static offset of the collective pitch and yaw diagram that has been optimized for cruising. This bias control can be adapted to all specific types of circumstances encountered on a helicopter (or other rotorcraft). To do this, limitation functions CL1, CL2, and CL3 are included in the bias control calculation module 107 of the computer 1.

The limitations as described in detail below are generated for a diagram that has been optimized for cruising, and thus for a bias control that varies towards hovering: a first limit CL1 varies as a function of the longitudinal speed of the vehicle; a second limit CL2 varies as a function of the position of the pedals.

FIG. 5 shows the characteristics of the limitation CL1 that causes the bias control to vary as a function of speed.

In the example shown in FIG. 5, the bias control is active during hovering and has a value Coef11, and it varies progressively towards the value Coef12 via a limitation coefficient CL1 that varies linearly (or in any other way) as a function of the speed V (along the abscissa): this coefficient is constant (equal to Coef11) for speeds that are close to hovering, and it begins to decrease starting from a first value SV1 of longitudinal speed during acceleration from hovering to cruising. The limitation coefficient CL1 becomes equal to Coef12 once the speed V has reached the value of another threshold SV2. The relationship for this variation, which is preferably linear, is selected in such a manner that the disappearance of the bias control as a function of speed takes place sufficiently progressively to avoid impeding the pilot and to avoid disturbing pilot assistance functions during acceleration. This type of varying limitation makes it possible to optimize the collective pitch and yaw diagram over the entire range of speeds for the helicopter in question.

With reference to FIG. 6, in order to optimize control, it may be necessary to make the bias control asymmetrical as a function of the position PP of the pedals (plotted along the abscissa). A symmetrical bias control would be added to the control on one side of the diagram but would be subtracted from the control on the other side. By including a limitation CL2 which modifies the bias control progressively as a function of the position of the pedals, it is possible to optimize yaw control while hovering. This limitation is constituted by a limitation coefficient CL2 which is equal to Coef21 for pedal positions that are below a threshold SP1 and which decreases progressively towards Coef22 on approaching a pedal threshold position of value SP2. The values of the thresholds and of the coefficients (Coef21 and Coef22) are selected so as to minimize the impact of varying the sensitivity of the associated control while the bias control is decreasing.

FIG. 7 shows the resulting diagram for hovering, that includes the variable bias control of the present invention.

The diagram shown in dashed lines is the diagram for cruising. The transition between the two diagrams is governed by the limitations CL1 and CL2.

In the particular circumstance where, because of constraints specific to the vehicle (e.g. mechanical constraints), the tail servo-control range does not enable a sufficiently large control range to be obtained for implementing the diagram in full, then truncations will occur.

These truncations applied to the collective pitch and yaw diagram lead to dead ranges for the pedals. A third limitation function CL3 operating as a function of the collective pitch can be provided in addition to the above-described limitations CL1 and CL2, in order to correct this effect if the dead range in the truncation is found to be unacceptable.

FIG. 8 shows such circumstances. The truncation TRO appears at a collective pitch threshold SC1.

The limitation shown in FIG. 9 is obtained by a limitation coefficient CL3 that is equal to Coef31 in the example shown so long as the collective pitch COL is below a threshold value SC1. It decreases with increasing collective pitch to a value Coef32 when the collective pitch COL reaches the threshold value SC2; by way of example, this threshold may be the maximum value for the collective pitch.

The bias control and its associated limitation functions can be calculated using information external to the system hosting the invention. In the event of a breakdown, a specific bias control processor device (setting it to zero or some other particular value) serves to return to a predetermined collective pitch and yaw diagram that is sufficiently robust to enable the flight to be continued.

By having varying bias control, the invention serves to achieve best optimization over all of the constraints that contribute to defining the yaw control system: i) the varying bias control makes it possible to offset artificially the static position of the pedals by recentering it (an ergonomic effect); ii) this bias control serves to optimize the sensitivity of the pedals without constraint (limiting any risk of piloted pumping); and iii) the varying bias control also makes it possible to recover yaw control on the unfavorable side (in hovering in the example described), but without losing a corresponding amount of control on the other side (improvement in operational performance).

This has the consequence of improving performance by combining the advantages of having two positions for the collective pitch and yaw diagram (cruising and hovering) without changing the rotor control range accessible to the pedals (minimizing any risk of pumping).

What is claimed is:

1. A method of controlling the pitch of blades of a tail rotor in a rotary-wing aircraft, the method comprising the following operations:
    a) generating a main control (18) for the pitch of the blades of the tail rotor as a function of a first control member (4b) for controlling the pitch of the blades of the tail rotor that is actuated by a pilot of the aircraft; and
    b) generating a collective pitch and yaw decoupling control (16) as a function of the collective pitch of the rotary wing;
    c) generating a bias control (17) that is variable as a function of the flying speed (V) of the aircraft and as a function of at least one of i) the main control and ii) the position (PP) of the first control member (4b); and
    d) adding (111) the bias control to said decoupling control and to said main control in order to obtain an overall control (10) and thereby control the pitch of the blades of the tail rotor.

2. A method according to claim 1, in which the bias control is also generated as a function of the collective pitch of the main rotor.

3. A method according to claim 1, in which variation (CL1) of the bias control as a function of the speed (V) takes place from a threshold (SV1, SV2).

4. A method according to claim 1, in which variation (CL1) of the bias control as a function of the speed (V) takes place along a slope that is linear or exponential.

5. A method according to claim 1, wherein,
    the first control member is a yaw control member, and
    variation of the bias control as a function of the flying speed, as a function of the main control (18), as a function of the position of the yaw control member (4b), and as a function of the collective pitch, comply(ies) with at least one monotonic function.

6. A method according to claim 1, in which variation (CL2) of the bias control as a function of the at least one of the main control and the position of the control member is asymmetrical.

7. A method according to claim 1, in which variation (CL2) of the bias control as a function of the position of the first control member is linear between two values (SP1, SP2).

8. A method according to claim 1, in which the bias control is also generated as a function (COL) of the position of a second control member (4a) actuated by the pilot to control the collective pitch of the main rotor.

9. A method according to claim 8, in which variation (CL3) of the bias control as a function of the position of the second control member is linear between two values (SC1, SC2)

10. The method of claim 1, wherein,
    the generating a bias control (17) is variable as a function of the flying speed (V) of the aircraft and as a function of both the main control and the position (PP) of the first control member (4b).

11. The method of claim 1, wherein,
    the generating a bias control (17) is variable as a function of the flying speed (V) of the aircraft and as a function of the main control.

12. The method of claim 1, wherein,
    the generating a bias control (17) is variable as a function of the flying speed (V) of the aircraft and as a function of the position (PP) of the first control member (4b).

13. A yaw control system for a rotary-wing aircraft having a main rotor and a tail rotor, the system including decoupling means (106) provided for delivering a decoupling control (16), and means (108) for generating a pilot control and delivering a main control (18) as a function of the position of a yaw control member (4b), the system further comprising calculation means (107) for determining a bias control (17) as a function of the yaw control and of the speed of the aircraft, and summing means (111) for adding the bias control to said decoupling control and to said main control in order to obtain an overall control (10) for the pitch of the blades of the tail rotor.

14. A system according to claim 13, in which the means (107) for determining a bias control include means (CL1) for limiting the bias control over ranges of speed values.

15. A system according to claim 13, in which the means (107) for determining a bias control include means (CL2) for limiting the bias control over ranges of yaw control values.

16. A system according to claim 13, in which the means (107) for determining a bias control include means (CL3) for limiting the bias control over ranges of control values for the collective pitch of the main rotor.

17. A system according to claim 13, in which the means (107) for determining a bias control are integrated in an electrical flight control computer (1).

18. A system according to claim 17, in which the decoupling means (106) and the means (108) for generating a main control are integrated in the electrical flight control computer (1) which is connected to transducers delivering signals or data concerning the positions of the yaw and collective pitch control members (4a, 4b) actuated by the pilot of the aircraft, and also to servo-controls (3) for adjusting the pitch of the blades of the tail rotor.

19. A system according to claim 13, which is connected to mechanical flight controls including a specially adapted actuator on the yaw axis.

20. A system according to claim 13, which is connected to mechanical flight controls including an additional actuator on the yaw axis.

* * * * *